US012726295B2

(12) United States Patent
Cui et al.

(10) Patent No.: US 12,726,295 B2
(45) Date of Patent: Sep. 1, 2026

(54) SYSTEMS AND METHODS FOR COVERAGE ENHANCEMENT IN NON TERRESTRIAL NETWORK

(71) Applicant: ZTE Corporation, Shenzhen (CN)

(72) Inventors: Fangyu Cui, Shenzhen (CN); Nan Zhang, Shenzhen (CN); Wei Cao, Shenzhen (CN); Junli Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 283 days.

(21) Appl. No.: 18/614,034

(22) Filed: Mar. 22, 2024

(65) Prior Publication Data

US 2025/0038892 A1 Jan. 30, 2025

Related U.S. Application Data

(63) Continuation of application No. PCT/CN2022/129395, filed on Nov. 3, 2022.

(51) Int. Cl.
*H04L 1/1812* (2023.01)
*H04L 5/00* (2006.01)

(52) U.S. Cl.
CPC .......... *H04L 1/1812* (2013.01); *H04L 5/0055* (2013.01)

(58) Field of Classification Search
CPC ....... H04L 1/1812; H04L 5/0055; H04L 1/08; H04L 1/1858; H04L 1/1864; H04L 1/1896; H04L 5/0053; H04L 1/0041; H04L 1/0073; H04B 7/1851; H04W 74/0833
See application file for complete search history.

(56) References Cited

U.S. PATENT DOCUMENTS

2021/0100004 A1 4/2021 Yang et al.
2021/0251016 A1* 8/2021 Xiong .................. H04L 1/0041
2022/0322417 A1 10/2022 Taherzadeh Boroujeni et al.
2023/0354340 A1* 11/2023 Su ............................ H04L 1/08
2024/0114522 A1* 4/2024 Cozzo .................. H04L 1/1854
2024/0306155 A1* 9/2024 Liu ...................... H04W 72/21
2024/0430930 A1* 12/2024 Kim ..................... H04W 72/23
(Continued)

FOREIGN PATENT DOCUMENTS

CN 115087125 A 9/2022
WO WO-2022/061881 A1 3/2022
(Continued)

OTHER PUBLICATIONS

Examination Search Report on CA Appl. No. 3232714 dated Jan. 9, 2026 (5 pages).

(Continued)

*Primary Examiner* — Michael A Keller
*Assistant Examiner* — Thao D Duong
(74) *Attorney, Agent, or Firm* — Foley & Lardner LLP

(57) ABSTRACT

Presented are systems and methods for coverage enhancement in non-terrestrial networks (NTN). A wireless communication device may determine a set of one or more resources to use for indicating information for physical uplink control channel (PUCCH) repetition of msg4 hybrid automatic repeat request acknowledgement (HARQ-ACK) transmission. The wireless communication device may send a msg1 transmission using the set of one or more resources, to indicate the information for the PUCCH repetition, to a wireless communication node.

8 Claims, 4 Drawing Sheets

(56) References Cited

U.S. PATENT DOCUMENTS

2025/0253934 A1* 8/2025 Zhao ....................... H04W 8/22
2026/0142765 A1* 5/2026 Liu ....................... H04L 5/0044

FOREIGN PATENT DOCUMENTS

WO WO-2022/077983 A1 4/2022
WO WO-2022/188685 A1 9/2022
WO WO-2022/216022 A1 10/2022
WO WO-2022/225697 A1 10/2022

OTHER PUBLICATIONS

Notice of Reasons for Rejection on JP Appl. No. 2024-518359 dated Dec. 22, 2025 (4 pages).
Second Office Action on CN Appl. No. 202510028070.6 dated Dec. 5, 2025 (14 pages).
International Search Report and Written Opinion for PCT Appl. No. PCT/CN2022/129395 mailed Jun. 25, 2023 (8 pages).
Extended European Search Report for EP Appl. No. 22958323.2, dated Mar. 3, 2025 (9 pages).
Notice of Reasons for Rejection for JP App. No. 2024-518359, dated Jun. 26, 2025 (with English translation, 6 pages).
First Office Action for CN Appl. No. 202510028070.6, dated Sep. 3, 2025 (with English translation, 17 pages).
Rejection Decision on CN Appl. No. 202510028070.6 dated Mar. 10, 2026 (16 pages).

* cited by examiner

SYSTEMS AND METHODS FOR COVERAGE ENHANCEMENT IN NON TERRESTRIAL NETWORK

CROSS-REFERENCE TO RELATED APPLICATION

This application claims the benefit of priority under 35 U.S.C. § 120 as a continuation of International Patent Application No. PCT/CN2022/129395, filed on Nov. 3, 2022, the disclosure of which is incorporated herein by reference in its entirety.

TECHNICAL FIELD

The disclosure relates generally to wireless communications, including but not limited to systems and methods for coverage enhancement in non-terrestrial network (NTN).

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments (e.g., including combining features from various disclosed examples, embodiments and/or implementations) can be made while remaining within the scope of this disclosure.

At least one aspect is directed to a system, method, apparatus, or a computer-readable medium of the following. A wireless communication device (e.g., a UE) may determine a set of one or more resources to use for indicating information (e.g., a request or a support) for physical uplink control channel (PUCCH) repetition of msg4 hybrid automatic repeat request acknowledgement (HARQ-ACK) transmission. The wireless communication device may send a msg1 transmission using the set of one or more resources, to indicate the information for the PUCCH repetition, to a wireless communication node (e.g., a BS). The information for the PUCCH repetition may comprise at least one of: a request for PUCCH repetition of msg4 HARQ-ACK transmission; or a support for PUCCH repetition of msg4 HARQ-ACK transmission.

In some embodiments, the wireless communication device may receive an indication of a repetition number for the PUCCH repetition, or a confirmation to support the PUCCH repetition in response to the msg1 transmission from the wireless communication node. The wireless communication device may determine (e.g., selecting) a repetition number for the PUCCH repetition, from a plurality of candidate repetition numbers. The determination (e.g., selection) may cause the wireless communication node to perform blind detection for the PUCCH repetition.

In some embodiments, the wireless communication device may send the msg1 transmission using the set of one or more resources, to indicate or recommend a repetition number to the wireless communication node. The set of one or more resources may correspond to the repetition number. Another set of one or more resources may correspond to a different repetition number.

In some embodiments, a wireless communication device (e.g., a UE) may determine at least one repetition number. The wireless communication device may send the repetition number to a wireless communication node (e.g., a BS/network) via a msg3 transmission.

In some embodiments, the determination of the at least one repetition number can be one of: from a predetermined value; or selected from at least one candidate values received from the wireless communication node. The wireless communication device may receive a confirmation to support the PUCCH repetition from the wireless communication node.

In some embodiments, the wireless communication device may receive the indication or the confirmation via at least one of: a system information block (SIB) signal, a master information block (MIB) signal, a msg2 transmission, or a downlink control information (DCI) signaling for msg4, from the wireless communication node. The wireless communication device may receive a configuration of one or more candidate repetition numbers, via at least one of: a system information block (SIB) signaling, a master information block (MIB) signaling, a msg2 transmission, or a downlink control information (DCI) signaling for msg4, from the wireless communication node. The wireless communication device may determine at least one of: a configuration of one or more candidate repetition numbers, an indication of a repetition number for the PUCCH repetition, or a confirmation to support the PUCCH repetition, according to a cell type or a network type.

In some embodiments, a wireless communication device (e.g., a UE) may send a msg3 transmission to request for demodulation reference signal (DMRS) bundling to a wireless communication node (e.g., a BS). The wireless communication device may send a msg4 hybrid automatic repeat request acknowledgement (HARQ-ACK) transmission with the DMRS bundling to the wireless communication node. The msg3 transmission may include a 1-bit value indicative of a request for the DMRS bundling. A time window for the DMRS bundling can be shorter than or equal to a segment length for pre-compensation. The wireless communication device may receive a configuration of the segment length via a system information block (SIB) signaling from the wireless communication node.

In some embodiments, a wireless communication node (e.g., a BS) may receive a msg1 transmission using a set of one or more resources from a wireless communication device (e.g., a UE). The using of the set of one or more resources can be indicative of information (e.g., a request or a support) for physical uplink control channel (PUCCH)

repetition of msg4 hybrid automatic repeat request acknowledgement (HARQ-ACK) transmission.

In some embodiments, a wireless communication node (e.g., a BS) may send a configuration comprising a plurality of candidate repetition numbers to a wireless communication device (e.g., a UE). The wireless communication node may receive a repetition number selected from the plurality of candidate repetition numbers from the wireless communication device.

In some embodiments, a wireless communication node (e.g., a BS) may receive a msg3 transmission to request for demodulation reference signal (DMRS) bundling from a wireless communication device (e.g., a UE). The wireless communication node may receive a msg4 hybrid automatic repeat request acknowledgement (HARQ-ACK) transmission with the DMRS bundling from the wireless communication device.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
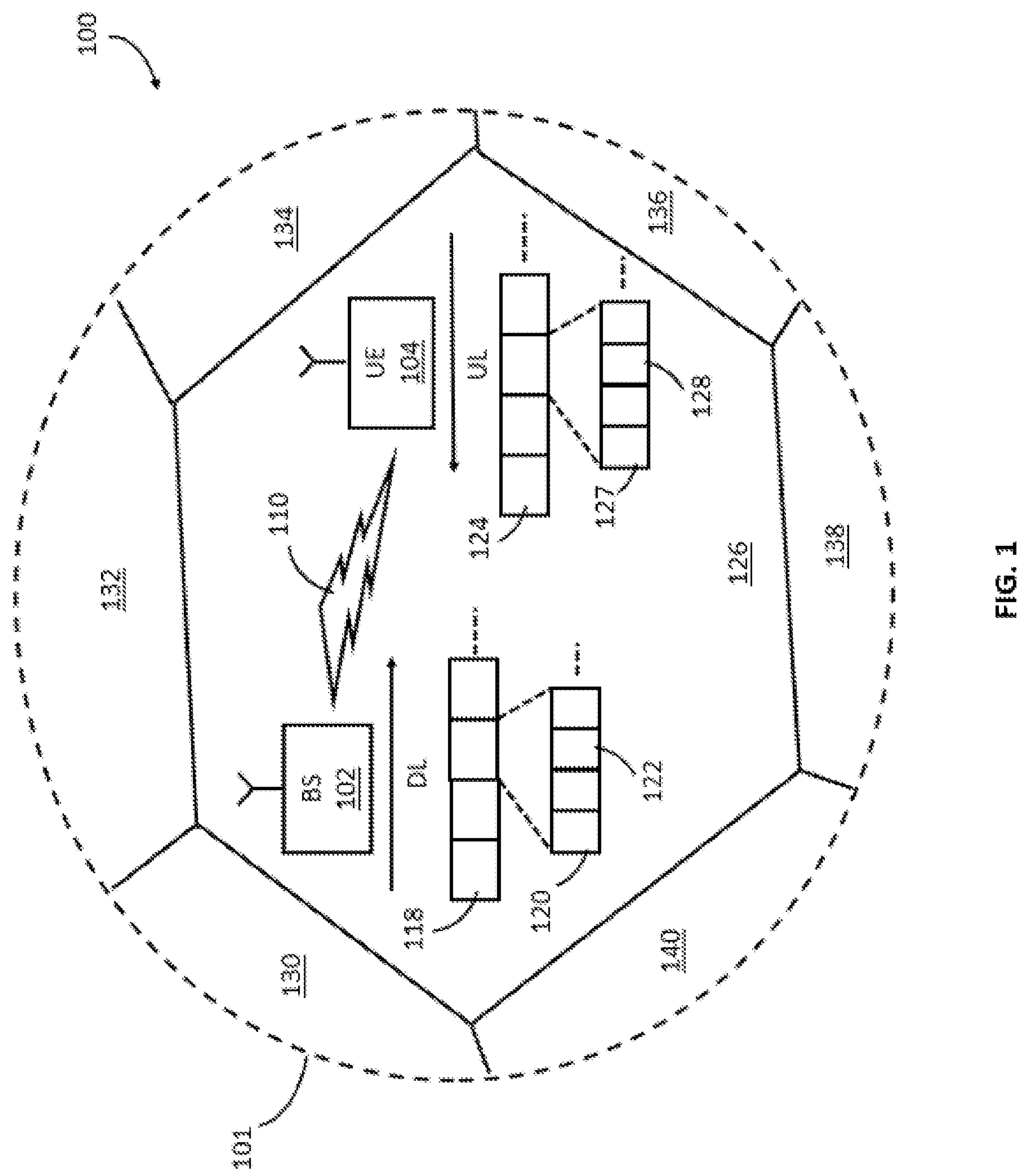
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
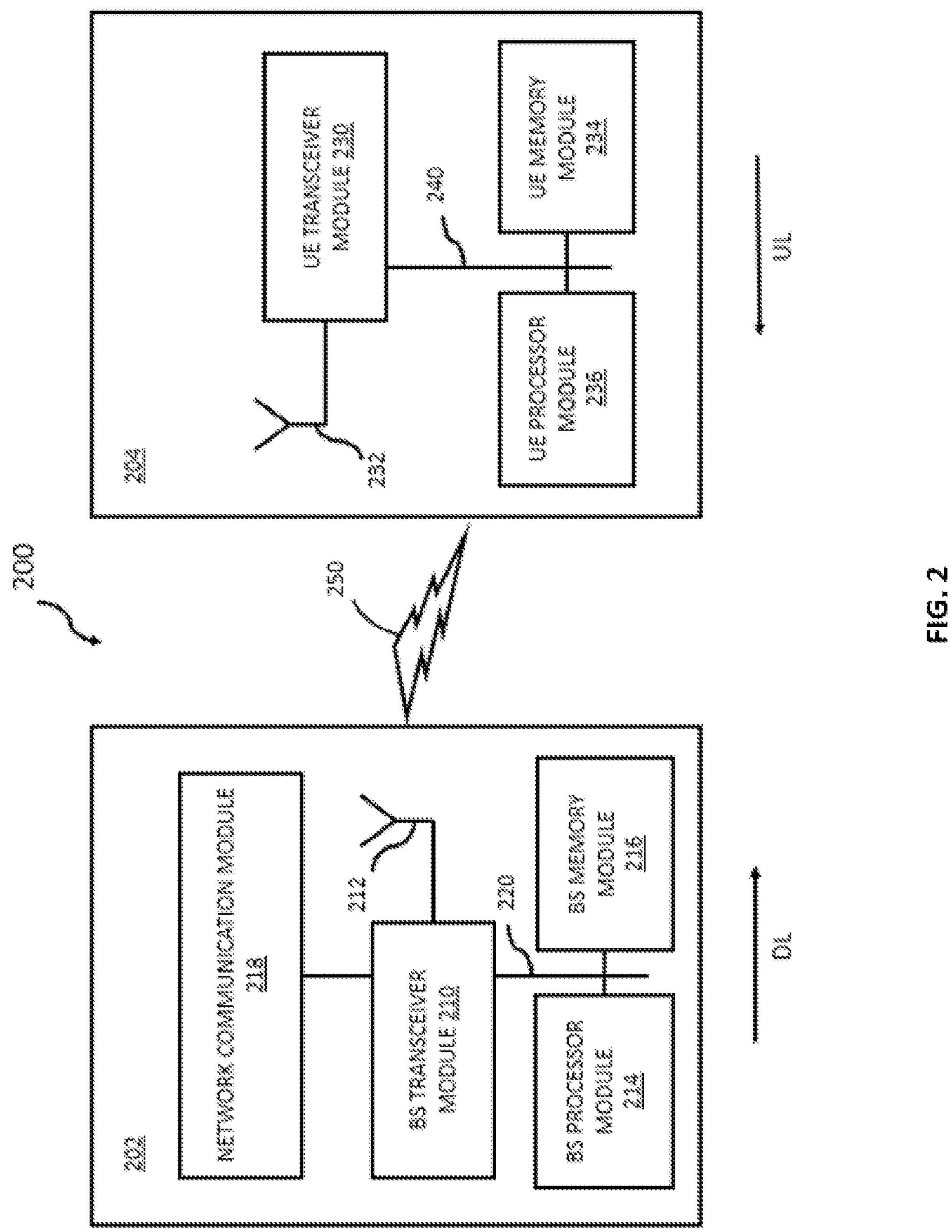
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (cNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Coverage Enhancement in Non-Terrestrial Network (NTN)

A coverage enhancement for non-terrestrial network (NTN) may mitigate performance loss due to a large distance between a user equipment (UE) and a satellite. For some commercial UEs (e.g., a smartphone), there can be coverage issues. A repetition can be considered to improve a coverage performance. In terrestrial network (TN) systems, a physical uplink control channel (PUCCH) repetition may not be supported for hybrid automatic repeat request (HARQ)-acknowledgement (ACK) transmission for message 4 (msg4). In this disclosure, a PUCCH repetition for HARQ-ACK transmission for msg4 is investigated. The systems and methods presented herein include novel approaches for coverage enhancement in non-terrestrial network.

Figure 3:
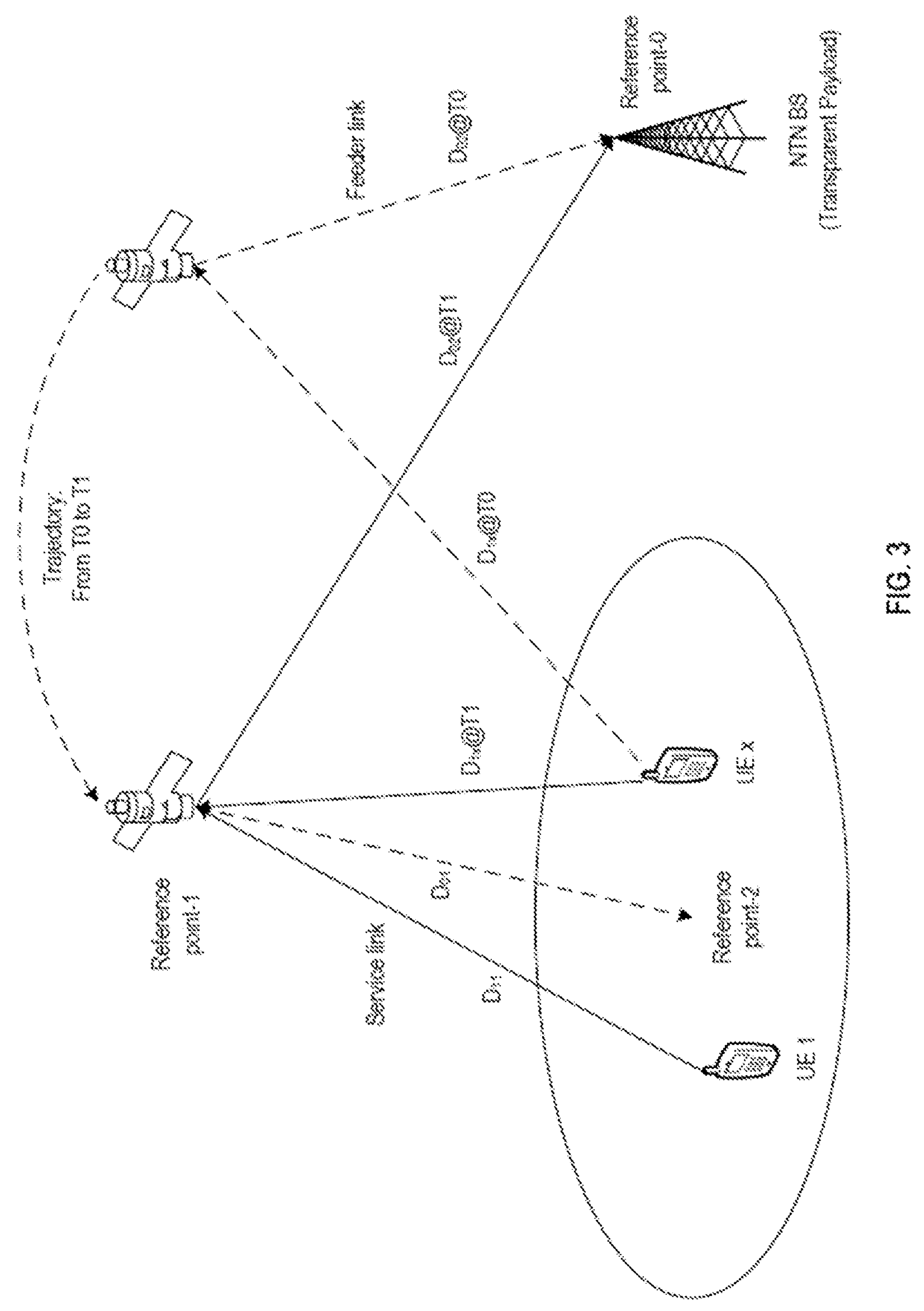
FIG. 3 illustrates an example non-terrestrial network (NTN), in accordance with some embodiments of the present disclosure.

FIG. 3 illustrates an example representation of a NTN, e.g., a transparent NTN. In some embodiments, the link between a UE and a satellite may be a service link. The link between a base station (BS) and a satellite may be a feeder link. The feeder link can be common for all UEs within the same cell.

In an initial access, 4-step random access channel (RACH) procedure can be applied. The initial access may indicate a sequence of process between a UE and a network (e.g., gNB) in order for the UE to acquire uplink synchronization and to obtain a specified identifier (ID) for a radio access communication. In some embodiments, the initial access can be referred to be a "RACH process." In msg4, a UE may receive contention resolution information from a BS. A UE may transmit HARQ-ACK for msg4 to a BS in PUCCH to confirm whether msg4 is successfully received. In TN systems, a repetition of such PUCCH may not be supported.

Implementation Example 1: Network Configuration for PUCCH Repetition

A PUCCH repetition for msg4 HARQ-ACK transmission may not be supported in TN systems. In order to support this feature, a new configuration signaling may be needed. Since msg4 HARQ-ACK transmission is performed in a RACH procedure, a radio resource control (RRC) connection may not be established. The new configuration may be signaled via at least one of: a system information block (SIB) broadcast, a master information block (MIB) broadcast, message 2 (msg2), or physical downlink control channel (PDCCH)/downlink control information (DCI) for msg4.

The configuration content may comprise at least one of followings: (i) candidate values for repetition factor/number of PUCCH, (ii) a specific value for repetition factor/number of PUCCH, or (iii) an enabling/confirmation signaling of repetition transmission of PUCCH. The candidate values (e.g., a set of values) for repetition factor/number of PUCCH can be indicated to a UE for selection. A UE may follow a configuration to use the specific value for repetition factor/number of PUCCH. If only one repetition factor/number is supported, the UE may use the repetition factor/number. If more than one repetition factors/numbers are supported, the UE may choose a suitable repetition factor/number from the candidate repetition factors/numbers. The network may perform a blind detection based on the candidate repetition factors/numbers.

Since PUCCH repetition for msg4 HARQ-ACK may only be supported for limited scenarios, the configuration may be implicitly indicated by a network type. In such case, at least one of followings can be supported: (i) candidate values for repetition factor/number of PUCCH can be implicitly indicated to the UE via a network type or a cell type; (ii) a specific value for repetition factor/number of PUCCH can be implicitly indicated to the UE via the network type or the cell type; (iii) an enabling signaling of repetition transmission of PUCCH can be implicitly indicated to the UE via the network type or the cell type. If only one repetition factor/number is supported, the UE may use the repetition factor/number. If more than one repetition factors/numbers are supported, the UE may choose a suitable one from the candidate repetition factors/numbers. The network may perform a blind detection based on the candidate repetition factors/numbers.

Implementation Example 2: UE Request for PUCCH Repetition

A PUCCH repetition for msg4 HARQ-ACK transmission may not be supported in TN systems. Hence, not all UEs can support the PUCCH repetition. With different elevation angles, a coverage can be different. Some UEs may need a repetition to mitigate performance loss, and some UEs may not need the repetition to mitigate performance loss. Hence, whether a repetition is needed and/or required may be determined by a UE. A UE may request a number of repetition from a transmitter.

Since msg4 is received in a RACH procedure, the UE can be possible to indicate the request of repetition in msg1 and/or msg3.

In msg1, a physical random access channel (PRACH) preamble can be transmitted. In the PRACH preamble, no data may be carried. If the UE wants to indicate a request of PUCCH repetition for msg4 HARQ-ACK, the UE may transmit msg1 in at least one set of resources. The at least one set of resources can be predefined or configured for the request of PUCCH repetition by the UE. At least one of following examples may be considered.

Example-1: A set of resources can be predefined or configured for UEs which may need/request/support PUCCH repetition for msg4 HARQ-ACK transmission. In some embodiments, the network may determine (e.g., indicate) the set of resources to use for indicating a request for physical uplink control channel (PUCCH) repetition of msg4 hybrid automatic repeat request acknowledgement (HARQ-ACK) transmission. The network may indicate the set of resources to use for indicating the request for PUCCH repetition of msg4 HARQ-ACK transmission to the UE. The UE may determine the set of resources to use for indicating the request for PUCCH repetition of msg4 HARQ-ACK transmission according to the indication by the network. If the UE transmits msg1 in the set of resources, the network may know/be aware of the UE's need/request/support for a repetition. The network may indicate a repetition factor/number. If only one repetition factor/number is supported, the network may not perform further indication or may indicate a confirmation of repetition transmission as described in the implementation example 1. The network may allocate PUCCH resources for msg4 HARQ-ACK transmission based on the repetition factor/number.

Example-1b: A set of resources can be predefined or configured for UEs which may need/request/support PUCCH repetition for msg4 HARQ-ACK transmission. If the UE transmits msg1 in the set of resources, the network may know/be aware of the UE's need/request/support for a repetition. A repetition number may be chosen/determined/selected by the UE from a set of candidate values predefined information or indicated by network as described in the implementation example 1. The network may not perform further indication or may indicate a confirmation of repetition transmission as described in the implementation example 1. The network may perform a blind detection of the PUCCH for msg4 HARQ-ACK if the number of candidate values is larger than 1. During the blind detection, the network may try different repetition numbers (e.g., 1, 2, 4, or 8) to detect the PUCCH.

Example-2: At least one set of resources can be predefined or configured for UEs which may need/request/support PUCCH repetition for msg4 HARQ-ACK transmission. Each set of resources may correspond to a specific repetition factor/number for the PUCCH. A UE may transmit msg1 in the set of resources (including a repetition number recommended by the UE). The network may know/be aware of the repetition factor/number recommended/suggested by the UE. The network may indicate a repetition factor/number. The repetition indicated by network may be determined according to the repetition factor/number recommended/suggested by the UE. The determination of the repetition number may consider the UE recommendation but is finally controlled by the BS. The network may allocate PUCCH resources for msg4 HARQ-ACK transmission based on the repetition factor/number.

Example-3: At least one set of resources can be predefined or configured for UEs which may need/request/support PUCCH repetition for msg4 HARQ-ACK transmission. A UE may transmit msg1 in the set of resources (including a repetition number recommended by the UE). Each set of resources may correspond to a specific repetition factor/number for the PUCCH. The network may know/be aware of how many repetitions the UE may use and may follow the request by the UE. The network may not perform indication or may indicate a confirmation of repetition transmission as described in the implementation example 1. The network may allocate PUCCH resources for msg4 HARQ-ACK transmission based on the repetition factor/number (e.g., may follow the recommended repetition number by the UE).

In certain embodiments, the at least one set of resources may be predefined information, or configured by the network via at least one of a SIB broadcast or a MIB broadcast.

In msg3, the UE may transmit some necessary information to the network for access (e.g., cell radio network temporary identifier (C-RNTI)). The msg3 may carry some payload. The UE may define a new bit field or re-interpret existing bit field in msg3 for signaling of the UE's request/support of PUCCH repetition for msg4 HARQ-ACK transmission. The signaling may be supported for certain scenarios (e.g., NTN). When the UE is served by an NTN cell, the signaling of UE's request/support of PUCCH repetition can be supported. At least one of following examples may be considered.

Example-4: A 1-bit field can be newly defined in msg3 or re-interpreted from existing bit field of msg3 (including reserved bit) to indicate the request/support of PUCCH repetition for msg4 HARQ-ACK transmission by a UE. For example, if '1' is signaled, it may indicate that a UE requests/supports the repetition. The network may know/be aware of the UE's need/request/support PUCCH repetition for msg4 HARQ-ACK transmission. If '0' is signaled or the bit field is absent, PUCCH repetition for msg4 HARQ-ACK transmission may not be needed/supported. The repetition number may be chosen/determined by the UE from a set of candidate values predefined information or indicated by the network as described in the implementation example 1. The number of candidate values may be one or larger than one. If the number of candidate values is equal to one, UE will use the value. The network may not perform indication or may indicate a confirmation of repetition transmission as described in the implementation example 1. The network may perform a blind detection of the PUCCH for msg4 HARQ-ACK if the number of candidate values is larger than 1. That is, the network may try different repetition numbers to detect the PUCCH. If the bit field is absent, PUCCH repetition for msg4 HARQ-ACK transmission may not be requested/supported by the UE. That is, the behaviors may be followed by the UE.

Example-5: A bit field can be newly defined in msg3 or re-interpreted from existing bit field of msg3 (including reserved bit) to indicate the requested/supported PUCCH repetition factor/number for msg4 HARQ-ACK transmission. The network may receive a repetition number selected from the plurality of candidate repetition numbers from the UE. The network may not perform indication or may indicate a confirmation of repetition transmission as described in the implementation example 1. The network may allocate PUCCH resources for msg4 HARQ-ACK transmission based on the repetition factor/number. The bit field size can be determined by the candidate values of repetition factor/number. The candidate values of repetition factor/number may be predefined information, or indicated by the network as described in the implementation example 1. If the bit field is absent, PUCCH repetition for msg4 HARQ-ACK transmission may not be requested/supported by the UE. That is, the behaviors may be followed by the UE.

Moreover, the repetition request can be achieved by combining msg1 and msg3. The msg1 may indicate the request/support of repetition, and the msg3 may indicate the selected repetition factor/number. In such case, at least one of following examples can be considered.

Example-6: A set of resources can be predefined or configured for UEs which may need//request/support PUCCH repetition for msg4 HARQ-ACK transmission as in the example-1. If the UE transmits msg1 in the set of resources, the network may know/be aware of the UE's request/support repetition and may indicate candidate repetition factors/numbers in msg2. The UE may indicate the selected/requested repetition factor/number in msg3 in a newly defined or re-interpreted bit field as in the example-5. The UE and the network may achieve consensus on the PUCCH repetition factor/number. The network may allocate PUCCH resources for msg4 HARQ-ACK transmission based on the repetition factor/number.

Example-7: A set of resources can be predefined or configured for UEs which may need/request/support PUCCH repetition for msg4 HARQ-ACK transmission as in the example-1. If the UE transmits msg1 in such set of resources, the network may know/be aware of the UE's request/support repetition, and may indicate whether the repetition function is enabled. The UE may indicate the selected/requested repetition factor/number in msg3 in a newly defined or re-interpreted bit field as in the example-5. The UE and the network may achieve consensus on the PUCCH repetition factor/number. The network may allocate PUCCH resources for msg4 HARQ-ACK transmission based on the repetition factor/number.

Implementation Example 3: UE Request for DMRS Bundling

A demodulation reference signal (DMRS) bundling can be considered as a method to enhance coverage performance. The DMRS bundling can be used to estimate reference signaling in a channel. The network may configure a DMRS bundling time domain window. The DMRS within the time window can be bundled for channel estimation, which provides better performance. If DMRS bundling is supported, the required PUCCH repetition factor/number may be reduced and resource overhead can be saved. However, since DMRS bundling is not a mandatory feature, whether a UE support/request DMRS bundling may be indicated to the network.

Whether a UE supports/requests the DMRS bundling can be carried in msg3. Similar as in the implementation example 2, the UE may define a new bit field or re-interpret existing bit field in msg3 for signaling of the UE's request/support DMRS bundling for PUCCH for msg4 HARQ-ACK transmission. The signaling may be supported for certain scenarios (e.g., NTN). When the UE is served by an NTN cell, the signaling of the UE's request/support of PUCCH repetition can be supported. At least one of following examples may be considered.

Example-1: A 1-bit field can be newly defined in msg3 or re-interpreted from an existing bit field of msg3 (including reserved bit) to indicate the request/support of DMRS bundling for PUCCH for msg4 HARQ-ACK transmission. For example, if 'l' is signaled, it may indicate that the UE requests/supports the DMRS bundling. The network may know/be aware of the UE's need/request/support DMRS bundling for PUCCH for msg4 HARQ-ACK transmission. If '0' is signaled or the bit field is absent, the DMRS bundling for PUCCH for msg4 HARQ-ACK transmission may not be needed/supported. The DMRS bundling time window may be same as a segment length for pre-compensation. The network may not perform indication or may indicate a confirmation of DMRS bundling in PDCCH, which may schedule msg4. If the time duration of PUCCH transmission (including repetitions) is shorter than the segment length for pre-compensation, all the DMRSs can be within the same bundle. In above example, the segment length for pre-compensation may be configured by the network via a SIB broadcast.

Moreover, the UE may indicate whether the UE support repetition and the DMRS bundling for PUCCH for msg4 HARQ-ACK transmission in the same signaling. At least one of following examples may be considered.

Example-2: A 1-bit field can be newly defined in msg3 or re-interpreted from a current/existing bit field of msg3 (including reserved bit) to indicate whether support repetition and DMRS bundling for PUCCH for msg4 HARQ-ACK transmission. For example, if "1" is signaled, it may indicate that the UE requests/supports both the repetition and the DMRS bundling. The network may perform blind detection of the PUCCH for msg4 HARQ-ACK, and may apply the DMRS bundling during the detection. If '0' is signaled, it may indicate that the UE requests/supports only repetition. The network may perform blind detection of the PUCCH for msg4 HARQ-ACK but may not apply DMRS bundling. If the bit field is absent, it may indicate that the UE does not request/support repetition. The network may follow a previous procedure in detection.

Example-3: A bit field can be newly defined in msg3 or re-interpreted from a current/existing bit field of msg3 (including reserved bit) to indicate a requested/supported PUCCH repetition factor/number for msg4 HARQ-ACK transmission as in example 5. One possible value can be used to indicate whether support DMRS bundling for PUCCH for msg4 HARQ-ACK transmission. For example, a 2-bit field can be defined, where "00" may indicate that 2 repetition transmission is requested/supported, "01" may indicate that 4 repetition transmission is requested/supported, "10" may indicate that 8 repetition transmission is requested/supported, and "11" may indicate that both 8 repetition transmission and DMRS bundling are requested/supported. The network may perform detection based on the UE's indication. Another example is that "11" may indicate that both repetition transmission and DMRS bundling are requested/supported but the detailed repetition factor/number is not indicated. In such case, the network may perform blind detection of the PUCCH for msg4 HARQ-ACK, and may apply DMRS bundling during the detection.

It should be understood that one or more features from the above implementation examples are not exclusive to the specific implementation examples, but can be combined in any manner (e.g., in any priority and/or order, concurrently or otherwise).

Figure 4:
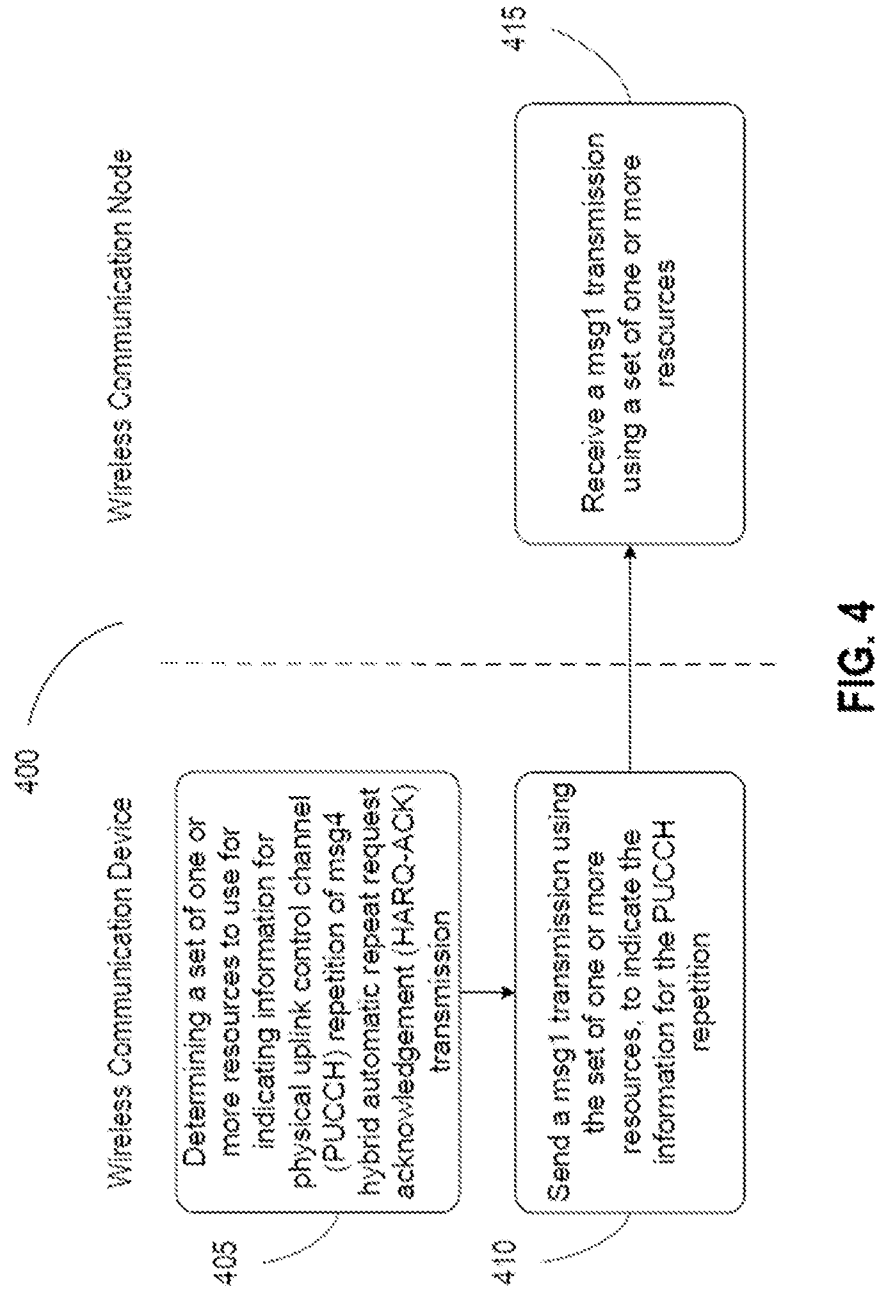
FIG. 4 illustrates a flow diagram for coverage enhancement in non-terrestrial network (NTN), in accordance with an embodiment of the present disclosure.

FIG. 4 illustrates a flow diagram for coverage enhancement in non-terrestrial network (NTN), in accordance with an embodiment of the present disclosure. The method 400 may be implemented using any one or more of the components and devices detailed herein in conjunction with FIGS. 1-2. In overview, the method 400 may be performed by a wireless communication device, in some embodiments. Additional, fewer, or different operations may be performed in the method 400 depending on the embodiment. At least one aspect of the operations is directed to a system, method, apparatus, or a computer-readable medium.

A wireless communication device (e.g., a UE) may determine a set of one or more resources to use for indicating information (e.g., a request or a support) for physical uplink control channel (PUCCH) repetition of msg4 hybrid automatic repeat request acknowledgement (HARQ-ACK) transmission. The wireless communication device may send a msg1 transmission using the set of one or more resources, to indicate the information for the PUCCH repetition, to a wireless communication node (e.g., a BS). The information for the PUCCH repetition may comprise at least one of: a request for PUCCH repetition of msg4 HARQ-ACK transmission; or a support for PUCCH repetition of msg4 HARQ-ACK transmission.

In some embodiments, the wireless communication device may receive an indication of a repetition number for the PUCCH repetition, or a confirmation to support the PUCCH repetition in response to the msg1 transmission from the wireless communication node. The wireless communication device may determine (e.g., selecting) a repetition number for the PUCCH repetition, from a plurality of candidate repetition numbers. The determination (e.g., selection) may cause the wireless communication node to perform blind detection for the PUCCH repetition.

In some embodiments, the wireless communication device may send the msg1 transmission using the set of one or more resources, to indicate or recommend a repetition number to the wireless communication node. The set of one or more resources may correspond to the repetition number. Another set of one or more resources may correspond to a different repetition number.

In some embodiments, a wireless communication device (e.g., a UE) may determine at least one repetition number. The wireless communication device may send the repetition number to a wireless communication node (e.g., a BS/network) via a msg3 transmission.

In some embodiments, the determination of the at least one repetition number can be one of: from a predetermined value; or selected from at least one candidate values received from the wireless communication node. The wireless communication device may receive a confirmation to support the PUCCH repetition from the wireless communication node.

In some embodiments, the wireless communication device may receive the indication or the confirmation via at least one of: a system information block (SIB) signal, a master information block (MIB) signal, a msg2 transmission, or a downlink control information (DCI) signaling for msg4, from the wireless communication node. The wireless communication device may receive a configuration of one or more candidate repetition factors/numbers, via at least one of: a system information block (SIB) signaling, a master information block (MIB) signaling, a msg2 transmission, or a downlink control information (DCI) signaling for msg4, from the wireless communication node. The wireless communication device may determine at least one of: a configuration of one or more candidate repetition numbers, an indication of a repetition number for the PUCCH repetition, or a confirmation to support the PUCCH repetition, according to a cell type or a network type.

In some embodiments, a wireless communication device (e.g., a UE) may send a msg3 transmission to request for demodulation reference signal (DMRS) bundling to a wireless communication node (e.g., a BS). The wireless communication device may send a msg4 hybrid automatic repeat request acknowledgement (HARQ-ACK) transmission with the DMRS bundling to the wireless communication node. The msg3 transmission may include a 1-bit value indicative of a request for the DMRS bundling. A time window for the DMRS bundling can be shorter than or equal to a segment length for pre-compensation. The wireless communication device may receive a configuration of the segment length via a system information block (SIB) signaling from the wireless communication node.

In some embodiments, a wireless communication node (e.g., a BS) may receive a msg1 transmission using a set of one or more resources from a wireless communication device (e.g., a UE). The using of the set of one or more resources can be indicative of information (e.g., a request or a support) for physical uplink control channel (PUCCH) repetition of msg4 hybrid automatic repeat request acknowledgement (HARQ-ACK) transmission.

In some embodiments, a wireless communication node (e.g., a BS) may send a configuration comprising a plurality of candidate repetition numbers to a wireless communication device (e.g., a UE). The wireless communication node may receive a repetition number selected from the plurality of candidate repetition numbers from the wireless communication device.

In some embodiments, a wireless communication node (e.g., a BS) may receive a msg3 transmission to request for demodulation reference signal (DMRS) bundling from a wireless communication device (e.g., a UE). The wireless communication node may receive a msg4 hybrid automatic repeat request acknowledgement (HARQ-ACK) transmission with the DMRS bundling from the wireless communication device.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:

sending, by a wireless communication device to a wireless communication node, a msg3 comprising an indication that the wireless communication device supports physical uplink control channel (PUCCH) repetition;

receiving, by the wireless communication device from the wireless communication node, at least one repetition number for the PUCCH repetition of msg4 hybrid automatic repeat request acknowledgement (HARQ-ACK) transmission, wherein:

when the at least one repetition number comprises a plurality of repetition numbers, the wireless communication device selects a repetition number from the plurality of repetition numbers according to an indication received via a downlink control information (DCI) signaling for msg4;

when the at least one repetition number comprises only one repetition number, the wireless communication device uses the only one repetition number for the PUCCH repetition; and transmitting, by the wireless communication device to the wireless communication node, the msg4 HARQ-ACK with the PUCCH repetition.

2. The method of claim 1, comprising:

receiving, by the wireless communication device from the wireless communication node, the indication of the repetition number via a system information block (SIB) broadcast.

3. A wireless communication device, comprising:

at least one processor configured to:

send, via a transceiver to a wireless communication node, a msg3 comprising an indication that the wireless communication device supports physical uplink control channel PUCCH) repetition;

receive, via the transceiver from the wireless communication node, at least one repetition number for PUCCH repetition of msg4 hybrid automatic repeat request acknowledgement (HARQ-ACK) transmission, wherein:

when the at least one repetition number comprises a plurality of repetition numbers, the wireless communication device selects a repetition number from the plurality of repetition numbers according to an indication received via a downlink control information (DCI) signaling for msg4;

when the at least one repetition number comprises only one repetition number, the wireless communication device uses the only one repetition number for the PUCCH repetition; and transmit, via the transceiver to the wireless communication node, the msg4 HARQ-ACK with the PUCCH repetition.

4. The wireless communication device of claim 3, wherein the at least one processor is configured to:

receive, via the transceiver from the wireless communication node, the at least one repetition number via a system information block (SIB) broadcast.

5. A method comprising:

receiving, by a wireless communication node from a wireless communication device, a msg3 comprising an indication that the wireless communication device supports physical uplink control channel (PUCCH) repetition;

transmitting, by the wireless communication node to the wireless communication device, at least one repetition number for PUCCH repetition of msg4 hybrid automatic repeat request acknowledgement (HARQ-ACK) transmission, wherein:

when the at least one repetition number comprises a plurality of repetition numbers, the wireless communication device selects a repetition number from the plurality of repetition numbers according to an indication received via a downlink control information (DCI) signaling for msg4;

when the at least one repetition number comprises only one repetition number, the wireless communication device uses the only one repetition number for the PUCCH repetition; and receiving, by the wireless communication node from the wireless communication device, the msg4 HARQ-ACK with the PUCCH repetition.

6. The method of claim 5, comprising:

transmitting, by the wireless communication node to the wireless communication device, the at least one repetition number via a system information block (SIB) broadcast.

7. A wireless communication node, comprising:

at least one processor configured to:

receive, via a transceiver from a wireless communication device, a msg3 comprising an indication that the wireless communication device supports physical uplink control channel PUCCH) repetition;

transmit, via the transceiver to the wireless communication device, at least one repetition number for PUCCH repetition of msg4 hybrid automatic repeat request acknowledgement (HARQ-ACK) transmission, wherein:

when the at least one repetition number comprises a plurality of repetition numbers, the wireless communication device selects a repetition number from the plurality of repetition numbers according to an indication received via a downlink control information (DCI) signaling for msg4;

when the at least one repetition number comprises only one repetition number, the wireless communication device uses the only one repetition number for the PUCCH repetition; and receive, via the transceiver from the wireless communication device, the msg4 HARQ-ACK with the PUCCH repetition.

8. The wireless communication device of claim 7, wherein the at least one processor is configured to:

transmit, via the transceiver to the wireless communication device, the at least one repetition number via a system information block (SIB) broadcast.

* * * * *